US010795942B2

(12) United States Patent
Geng et al.

(10) Patent No.: US 10,795,942 B2
(45) Date of Patent: Oct. 6, 2020

(54) METHOD AND DEVICE FOR RESIDING SHORT MESSAGE VERIFICATION CODE

(71) Applicant: BEIJING BYTEDANCE NETWORK TECHNOLOGY CO., LTD., Beijing (CN)

(72) Inventors: Dawei Geng, Beijing (CN); Xinji Shen, Beijing (CN)

(73) Assignee: BEIJING BYTEDANCE NETWORK TECHNOLOGY CO LTD., Beijing (CN)

( * ) Notice: Subject to any disclaimer, the term of this patent is extended or adjusted under 35 U.S.C. 154(b) by 442 days.

(21) Appl. No.: 15/305,025

(22) PCT Filed: Apr. 20, 2015

(86) PCT No.: PCT/CN2015/076933
§ 371 (c)(1),
(2) Date: Oct. 18, 2016

(87) PCT Pub. No.: WO2015/161760
PCT Pub. Date: Oct. 29, 2015

(65) Prior Publication Data
US 2017/0199941 A1    Jul. 13, 2017

(30) Foreign Application Priority Data
Apr. 22, 2014 (CN) .......................... 2014 1 0162920

(51) Int. Cl.
*G06F 16/903* (2019.01)
*G06F 16/9038* (2019.01)
(Continued)

(52) U.S. Cl.
CPC .... *G06F 16/90344* (2019.01); *G06F 16/9038* (2019.01); *G06F 21/31* (2013.01); *G06F 21/42* (2013.01); *G06F 3/0481* (2013.01)

(58) Field of Classification Search
CPC ......... G06F 17/30985; G06F 17/30991; G06F 16/90344; G06F 16/9038
(Continued)

(56) References Cited

U.S. PATENT DOCUMENTS

2006/0165060 A1   7/2006   Dua
2007/0254683 A1  11/2007   Jie et al.
(Continued)

FOREIGN PATENT DOCUMENTS

CN    101064603 A    10/2007
CN    101309516 A    11/2008
(Continued)

OTHER PUBLICATIONS

State Intellectual Property Office (P.R.C.) as the International Searching Authority, International Search Report and Written Opinion for PCT/CN2015/076933, dated Jun. 29, 2015.
(Continued)

*Primary Examiner* — Joshua Bullock
(74) *Attorney, Agent, or Firm* — Mauriel Kapouytian Woods LLP; Liang Huang; Michael Mauriel

(57) ABSTRACT

Provided are a method and device for residing a short message verification code. This method includes: conducting keyword matching on a short message content using a regular expression; when the short message content contains a keyword, matching a verification code for the short message content using the regular expression, to acquire a matched verification code; and displaying the verification code on a current interface and displaying a pre-set time. This method can automatically extract a verification code in a short message and display a pre-set time on a current interface. Within this pre-set time, a user can fill in a verification code on a verification code interface according to the displayed verification code without the need for the
(Continued)

user to remember the verification code and to frequently switch between a short message application and a current application as well.

17 Claims, 3 Drawing Sheets

(51) Int. Cl.
    *G06F 21/42*     (2013.01)
    *G06F 21/31*     (2013.01)
    *G06F 3/0481*     (2013.01)

(58) Field of Classification Search
    USPC ............................................................ 707/687
    See application file for complete search history.

(56) References Cited

U.S. PATENT DOCUMENTS

| | | | |
|---|---|---|---|
| 2008/0129755 A1 | 6/2008 | Nakamura | |
| 2010/0122330 A1* | 5/2010 | McMillan | H04L 63/12 |
| | | | 726/6 |
| 2011/0238301 A1 | 9/2011 | Lee | |
| 2011/0298596 A1* | 12/2011 | Warrick | G06F 21/305 |
| | | | 340/12.53 |
| 2012/0005589 A1* | 1/2012 | Han | H04L 63/168 |
| | | | 715/741 |
| 2013/0145169 A1 | 6/2013 | Poovendran et al. | |
| 2014/0313031 A1* | 10/2014 | Gupta | G07C 1/20 |
| | | | 340/539.13 |
| 2016/0006864 A1* | 1/2016 | Park | G06F 17/30873 |
| | | | 715/835 |
| 2017/0316515 A1* | 11/2017 | Varma | G06Q 50/01 |

FOREIGN PATENT DOCUMENTS

| | | |
|---|---|---|
| CN | 101576798 A | 11/2009 |
| CN | 101727288 A | 6/2010 |
| CN | 102255923 A | 11/2011 |
| CN | 102624705 A | 8/2012 |
| CN | 102830801 A | 12/2012 |
| CN | 103177012 A | 6/2013 |
| CN | 103186857 A | 7/2013 |
| CN | 103546877 A | 1/2014 |
| CN | 103902740 A | 7/2014 |

OTHER PUBLICATIONS

Qu et al., "Research on security of WLAN authentication system," China Mobile Network and Information Security Column, Telecom Engineering Technics and Standardization, 2013, No. 12, 6 pages.

* cited by examiner

METHOD AND DEVICE FOR RESIDING SHORT MESSAGE VERIFICATION CODE

The present disclosure is the national phase of International Application No. PCT/CN2015/076933, titled "METHOD AND DEVICE FOR RESIDING SHORT MESSAGE VERIFICATION CODE," filed on Apr. 20, 2015, which claims priority to Chinese Patent Application No. 201410162920.3, titled "METHOD FOR RESIDING VERIFICATION CODE IN SHORT MESSAGE AND DEVICE THEREOF," filed on Apr. 22, 2014 with the State Intellectual Property Office of People's Republic of China, both of which are incorporated herein by reference in their entirety.

TECHNICAL FIELD

The present disclosure relates to the field of mobile communication, and in particular to a method for residing a verification code in a short message and a device thereof.

BACKGROUND

At present, a short message application in a mobile device is often used to receive verification messages for consumption, registration, activation or confirmation. In practice, after receiving a notification for a short message, viewing the short message, reading the short message and recognizing the verification code from text of the short message, a user needs to input a verification code at a corresponding location on a verification code interface. Therefore, the entire process is very cumbersome. Especially in a case that the verification code is to be received and inputted by the same one mobile device, switching needs to be performed frequently between an interface of the short message application and an input interface for the verification code.

In addition, after seeing the verification code on the interface of the short message application, the user needs to memorize the verification code for a period of time to accurately input the verification code on the input interface for the verification code, which is a bad experience for a user with a poor memory. Therefore, it is desired to provide a new method for facilitating inputting of the verification code by the user and improving user experience.

SUMMARY

In view of the above, a method for residing a verification code in a short message and a device thereof are provided according to the present disclosure, for facilitating inputting the verification code by a user and improving user experience.

In order to achieve the above object, the following technical solutions are provided according to embodiments of the present disclosure.

A method for residing a verification code in a short message is provided, which includes:

performing keyword matching on content of the short message based on a regular expression;

performing verification code matching on the content of the short message based on a regular expression in a case that the content of the short message includes a keyword, where the verification code includes a digit, a letter or a combination thereof;

obtaining the matched verification code; and displaying the verification code on an interface for preset time.

Preferably, in the performing the keyword matching on the content of the short message based on the regular expression, the keyword may include one or more of verification code, verification word, activation code, activation word, check code, check word, confirmation code, confirmation word, checking code and checking word.

Preferably, the method may further include:

obtaining a keyword in a case that the content of the short message includes the keyword;

combining the keyword and the verification code into a string; and displaying the string on an interface for preset time.

Preferably, the preset time may be 20 s.

Preferably, the displaying the verification code on the interface for the preset time may include:

generating a notification based on the verification code and the preset time and sending the notification to a status bar; and displaying the notification by the status bar.

Preferably, the displaying the string on the interface for the preset time may include:

generating a notification based on the string and the preset time and sending the notification to the status bar; and displaying the notification by the status bar.

Preferably, the status bar may be displayed at the top, the bottom, the far left or the far right of a screen of a mobile device.

A device for residing a verification code in a short message is provided, which includes:

a keyword matching unit configured to perform keyword match on content of the short message based on a regular expression;

a verification code matching unit configured to perform verification code matching on the content of the short message based on a regular expression in a case that the content of the short message includes a keyword, where the verification code includes a digit, a letter or a combination thereof;

a first obtaining unit configured to obtain the matched verification code; and a display unit configured to display the verification code on an interface for preset time.

Preferably, the device may further include a second obtaining unit configured to obtain a keyword in a case that the content of the short message includes the keyword.

Preferably, the device may further include a combining unit configured to combine the keyword and the verification code into a string; and the display unit may be further configured to display the string on an interface for preset time.

Compared with the conventional technology, the present disclosure has the following benefits.

In the embodiments of the present disclosure, the verification code in the short message can be extracted automatically and displayed on the interface for the preset time. During the preset time, a user can input the verification code on an input interface for the verification code based on the displayed verification code. In this way, the user does not need to memorize the verification code and does not need to switch between a short message application and a current application frequently. In the method, the verification code is displayed on the interface for the verification code directly, thereby greatly facilitating inputting of the verification code by the user and improving user experience.

BRIEF DESCRIPTION OF THE DRAWINGS

In order to illustrate technical solutions in embodiments of the invention or in the conventional technology more clearly, drawings used in the description of the embodiments or the conventional technology are introduced briefly hereinafter. Apparently, the drawings described hereinafter merely illustrate some embodiments of the invention, and other drawings may be obtained by those skilled in the art based on these drawings without any creative efforts.

DETAILED DESCRIPTION OF THE EMBODIMENTS

The technical solutions in embodiments of the present disclosure are clearly and completely described hereinafter in conjunction with the drawings in the embodiments of the present disclosure. Apparently, the described embodiments are only a few rather than all of the embodiments of the present disclosure. All other embodiments obtained by those skilled in the art based on the embodiments of the present disclosure without any creative efforts fall within the scope of protection of the present disclosure.

Figure 1:
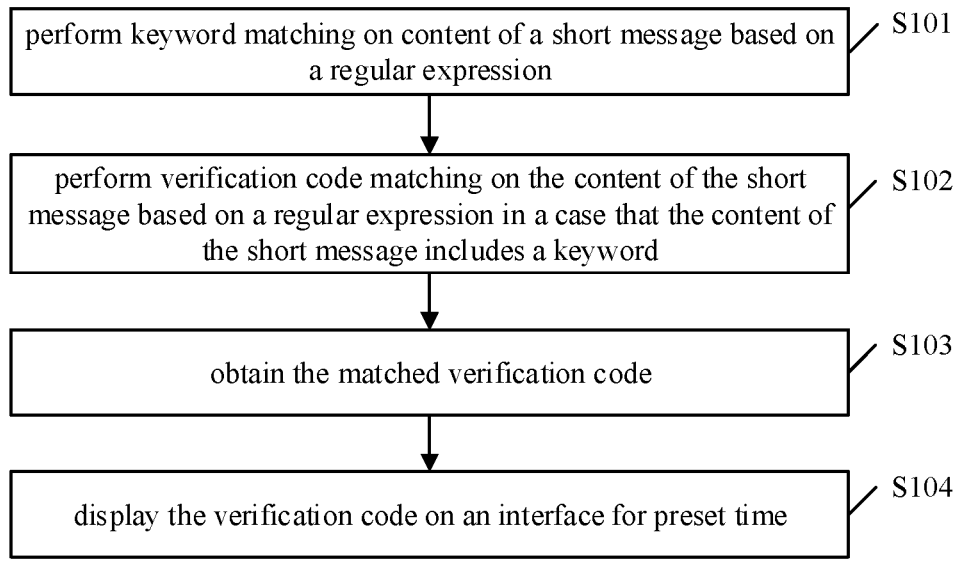
FIG. 1 is a flow chart of a method for residing a verification code in a short message according to an embodiment of the present disclosure.

A method for residing a verification code in a short message is provided according to the present disclosure. As shown in FIG. 1, the method includes steps S101 to S104.

In step S101, keyword matching is performed on content of the short message based on a regular expression.

A regular expression is also referred to as a regular representation. In computer science, a regular expression refers to a single string which is used to describe or match a series of strings meeting a particular syntactic rule. A regular expression is usually used to retrieve and/or replace text content having a particular pattern.

In the present disclosure, the regular expression is used to detect whether the content of the short message includes a keyword. Specifically, matching is performed on all phrases in the content of the short message with respect to all keywords to determine whether the content of the short message includes the keyword.

In performing keyword matching, the keyword includes one or more of verification code, verification word, activation code, activation word, check code, check word, confirmation code, confirmation word, checking code and checking word. It is to be understood that, the keyword in the present disclosure may further include other words similar to the verification code.

Matching is performed on the content of the short message with respect to the above keywords. In a case that the content of the short message includes any one of the above keywords, the content of the short message is determined to include the keyword, and the process goes to step S102. In a case that the content of the short message does not include any word related to the keyword, it is determined that the short message includes no verification code, and no process is performed.

In step S102, in a case that the content of the short message includes the keyword, verification code matching is performed on the content of the short message based on a regular expression. The verification code includes a digit, a letter or a combination thereof.

In a case that that the content of the short message includes the keyword, it is determined that the content of the short message may include the verification code, and thus matching is performed on the content of the short message based on the regular expression.

At present, a verification code usually includes a digit, a letter or a combination thereof, and has a length of 4 to 9 characters. Therefore, in the embodiment, verification code matching is performed with respect to 4 to 9 digits or letters. In a case that the verification code matching of 4 to 9 digits or letters is successful, it is determined that the verification code is included. If the verification code matching of a larger or smaller number of digits or letters is successful, it is determined that no verification code is included, and no processing is performed. It is to be understood that, the number of characters in the verification code is not the emphasis of the present disclosure, and in a case that a verification code with other number of characters is used to implement the present disclosure, it also falls within the scope of protection of the present disclosure.

At present, content of a short message mainly includes Chinese characters. A string in the content of the short message is extracted based on the regular expression, and it is determined whether the string has a length within a range from 4 to 9 characters. If the length is within the range, the string is determined as the verification code temporarily. If the content of the short message includes multiple strings meeting a requirement on the verification code, verification code extracting is not performed on the short message. If the multiple strings are extracted, it may bring trouble to a user since the user cannot determine which one is the needed verification code. Therefore, in a case that there are multiple strings meeting the requirement on the verification code, verification code extracting is not performed on the content of the short message. In this case, the user may open the short message and input the verification code in a conventional manner.

In step S103, the matched verification code is obtained.

In step S104, the verification code is displayed on an interface for preset time.

The verification code may be displayed on the interface for the preset time to enable the user to complete the input of the verification code within the preset time. Preferably, the preset time is 20 s.

Preferably, a notification is generated based on the verification code and the preset time and is sent to a status bar, and the notification is displayed by the status bar. That is, the notification is displayed by the status bar for the preset time.

Preferably, the status bar may be at the top, the bottom, the far left or the far right of a screen of a mobile device. That is, a location for displaying the verification code may be arbitrary, as long as the user is not prevented from inputting the verification code.

The method for residing a verification code in a short message is provided according to the present disclosure. In the method, the verification code in the short message can be extracted automatically and displayed on the interface for the preset time. During the preset time, a user can input the verification code on a verification code interface based on the displayed verification code. In this way, the user does not need to memorize the verification code and does not need to switch between a short message application and a current application frequently. In the method, the verification code is displayed on the interface for the verification code directly, and it only takes one step to input the verification code, i.e., manually inputting the verification code, thereby greatly facilitating inputting of the verification code by the user and improving user experience.

In the present disclosure, the content of the verification code resides on the interface. In an aspect, the content of the verification code is presented for the user considerably, so that the user can read and input the verification code without interrupting a current operation. In another aspect, in the present disclosure, the verification code is not inputted into an input box on the current interface rashly, since in this case, unnecessary trouble would be caused to the user if the current input box is not an input box for the current verification code. The present disclosure can solve the above problems very well and improve user experience.

Figure 2:
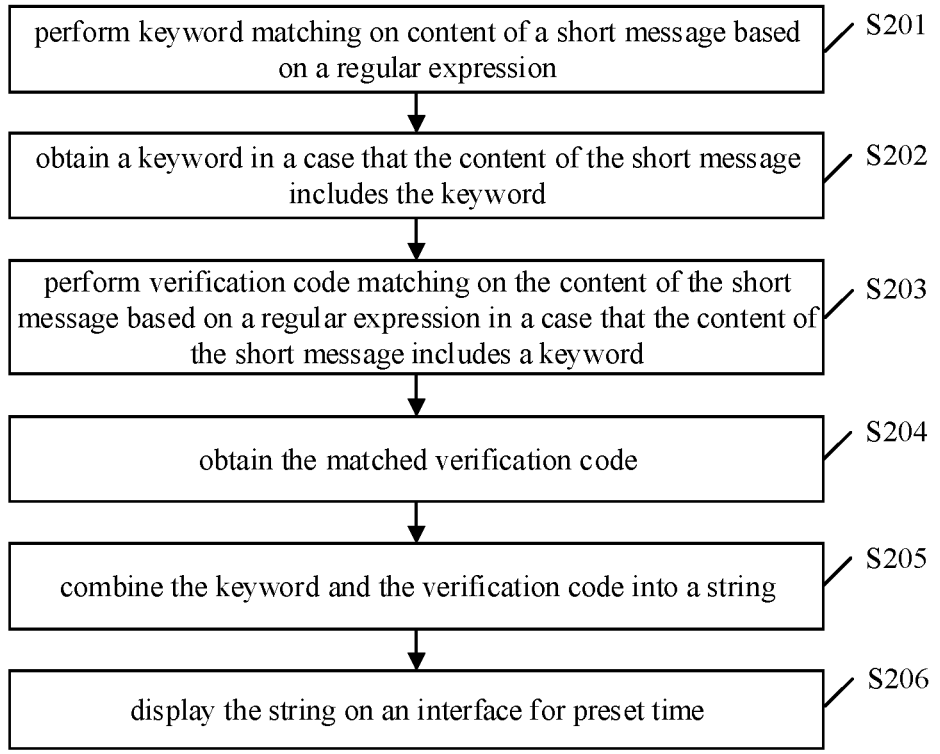
FIG. 2 is a flow chart of another method for residing a verification code in a short message according to an embodiment of the present disclosure.

On the basis of the above embodiments, another embodiment is further provided in the present disclosure. As shown in FIG. 2, the embodiment includes steps S201 to S206.

In step S201, keyword matching is performed on content of a short message based on a regular expression.

In step S202, in a case that the content of the short message includes a keyword, the keyword is obtained.

In step S203, in a case that the content of the short message includes the keyword, verification code matching is performed on the content of the short message based on a regular expression. A verification code includes a digit, a letter or a combination thereof.

In step S204, the matched verification code is obtained.

In step S205, the keyword and the verification code are combined into a string.

In step S206, the string is displayed on an interface for preset time.

Preferably, a notification is generated based on the string and the preset time and is sent to a status bar, and the notification is displayed by the status bar.

In the embodiment, instead of only the verification code, the string including the keyword and the verification code is displayed on the interface to notify a user that a combination of a digit and/or a letter displayed on the interface, which has a length of 4 to 9 characters, is the verification code, so that user experience is improved.

Figure 3:
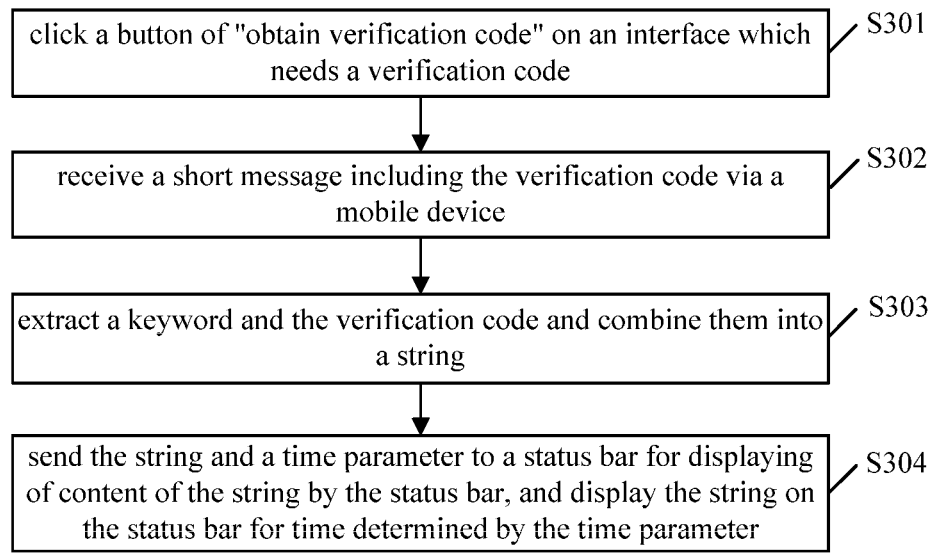
FIG. 3 is a flow chart of still another method for residing a verification code in a short message according to an embodiment of the present disclosure.

A specific embodiment is further provided in the present disclosure. As shown in FIG. 3, the specific embodiment includes steps S301 to S304.

In step S301, a user clicks a button of "obtain verification code" on an interface which needs a verification code.

In step S302, a short message including the verification code is received via a mobile device. Content of the short message is that: your verification code is relulo, please do not forward the verification message to other people for the security of your account.
[Smartisan Digital]

In step S303, a keyword and the verification code are extracted and combined into a string.

After performing matching on the content of the short message based on a regular expression, it is obtained that the resultant keyword is "verification code", content of the verification code is "relulo", and the combined string is "verification code: relulo".

In step S304, the string and a time parameter are sent to a status bar for displaying of content of the string by the status bar, and the string is displayed on the status bar for time determined by the time parameter.

Figure 4:
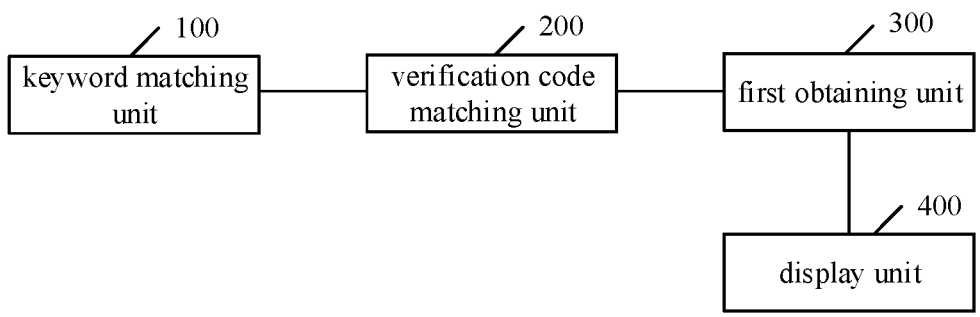
FIG. 4 is a schematic structural diagram a device for residing a verification code in a short message according to an embodiment of the present disclosure.

As shown in FIG. 4, a device for residing a verification code in a short message is further provided according to the present disclosure, which includes:

a keyword matching unit 100 configured to perform keyword match on content of the short message based on a regular expression;

a verification code matching unit 200 configured to perform verification code matching on the content of the short message based on a regular expression in a case that the content of the short message includes a keyword, where the verification code includes a digit, a letter or a combination thereof;

a first obtaining unit 300 configured to obtain the matched verification code; and a display unit 400 configured to display the verification code on an interface for preset time.

Figure 5:
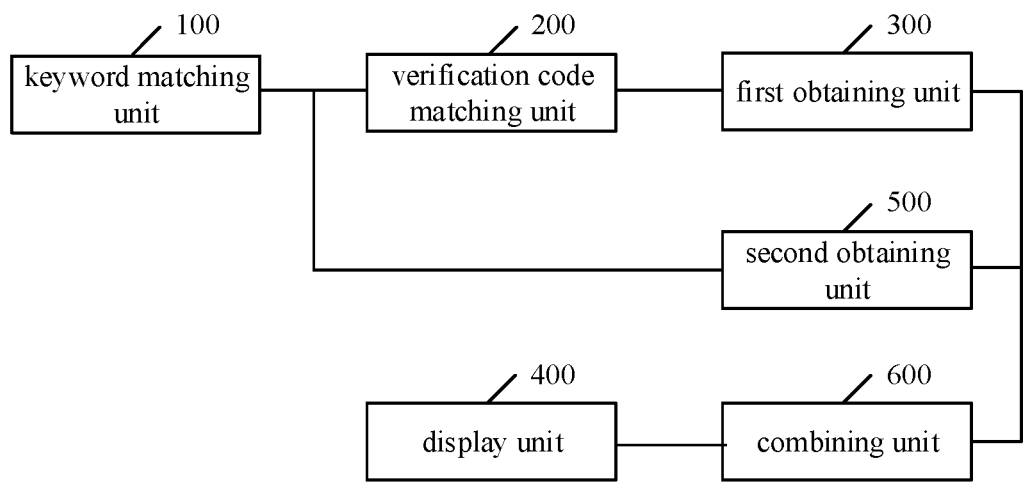
FIG. 5 is a schematic structural diagram of another device for residing a verification code in a short message according to an embodiment of the present disclosure.

Preferably, as shown in FIG. 5, the device further includes:

a second obtaining unit 500 configured to obtain a keyword in a case that the content of the short message includes the keyword.

Preferably, as shown in FIG. 5, the device further includes:

a combining unit 600 configured to combine the keyword and the verification code into a string; and the display unit 400 is further configured to display the string on an interface for preset time.

The device for residing a verification code in a short message is provided according to the present disclosure. The device can extract the verification code in the short message automatically and display the verification code on the interface for the preset time. During the preset time, a user can input the verification code on a verification code interface based on the displayed verification code. In this way, the user does not need to memorize the verification code and does not need to switch between a short message application and a current application frequently. The verification code is displayed on the interface for the verification code directly, and it only takes one step to input the verification code, i.e., manually inputting the verification code, thereby greatly facilitating inputting of the verification code by the user and improving user experience.

If a function described in the method according to the embodiments is implemented in a form of a software functional unit and is sold or used as a separate product, it may be stored in a computer readable storage medium. With this in mind, part of the embodiments of the present disclosure which contributes to the convention technology, or, part of the technical solutions may be implemented in a form of a software product, and the software product is stored in a storage medium and includes several instructions for enabling a computer device (which may be a personal computer, a server, a mobile computer device or a network device, etc.) to execute all or some of the steps in the method according to the embodiments of the present disclosure. The storage medium includes a medium capable of storing program codes, such as a USB flash disk, a mobile hard disk, a read-only memory (ROM), a random access memory (RAM), a magnetic disk or an optical disk.

The various embodiments of the present disclosure are described in a progressive way, differences from other embodiments are emphatically illustrated in each of the embodiments, and reference can be made to each other for understanding the same or similar sections.

The above descriptions of the disclosed embodiments enable those skilled in the art to implement or use the present disclosure. Various changes to the embodiments are appar-

What is claimed is:

1. A method for residing a verification code in a short message received by a mobile device, the method comprising:
   by a processor in the mobile device,
      determining whether content of the short message comprises a keyword by performing keyword matching on the content of the short message received by the mobile device based on a first regular expression;
      extracting a verification code from the content of the short message received by the mobile device by performing verification code matching on the content of the short message received by the mobile device based on a second regular expression, upon determining that the content of the short message comprises the keyword, wherein the verification code comprises a digit, a letter or a combination thereof;
      obtaining the extracted verification code; and
      displaying the verification code on a verification code input interface of a current application on a screen of the mobile device for preset time,
      wherein the short message is received in a short message application of the mobile device, and the current application is different from the short message application,
      wherein the first regular expression is a first string for detecting whether the content of the short message comprises the keyword based on a first syntactic rule, and
      wherein the second regular expression is a second string for detecting whether the content of the short message comprises the verification code based on a second syntactic rule.

2. The method according to claim 1, wherein in the performing the keyword matching on the content of the short message received by the mobile device based on the first regular expression, the keyword comprises one or more of verification code, verification word, activation code, activation word, check code, check word, confirmation code, confirmation word, checking code and checking word.

3. The method according to claim 1, further comprising:
   obtaining the keyword upon determining that the content of the short message received by the mobile device comprises the keyword;
   combining the keyword and the verification code into a string; and
   displaying the string on the verification code input interface for preset time.

4. The method according to claim 3, wherein the displaying the string on the verification code input interface for the preset time comprises:
   generating a notification based on the string and the preset time and sending the notification to a status bar on the screen of the mobile device; and
   displaying the notification by the status bar.

5. The method according to claim 4, wherein the status bar is displayed at the top, the bottom, the far left or the far right of the screen of the mobile device.

6. The method according to claim 3, wherein the preset time is 20 s.

7. The method according to claim 1, wherein the preset time is 20 s.

8. The method according to claim 1, wherein the displaying the verification code on the verification code input interface of the current application on the screen of the mobile device for the preset time comprises:
   generating a notification based on the verification code and the preset time and sending the notification to a status bar on the screen of the mobile device; and
   displaying the notification by the status bar.

9. The method according to claim 8, wherein the status bar is displayed at the top, the bottom, the far left or the far right of the screen of the mobile device.

10. A mobile device, comprising:
    a processor; and
    a memory storing instructions, which, when executed by the processor, cause the processor to:
    determine whether content of a short message received by the mobile device comprises a keyword by performing keyword matching on the content of the short message received by the mobile device based on a first regular expression;
    extract a verification code from the content of the short message received by the mobile device by performing verification code matching on the content of the short message received by the mobile device based on a second regular expression, upon determining that the content of the short message comprises the keyword, wherein the verification code comprises a digit, a letter or a combination thereof;
    obtain the extracted verification code; and
    display the verification code on verification code input interface of a current application on a screen of the mobile device for preset time,
    wherein the short message is received in a short message application of the mobile device, and the current application is different from the short message application,
    wherein the first regular expression is a first string for detecting whether the content of the short message comprises the keyword based on a first syntactic rule, and
    wherein the second regular expression is a second string for detecting whether the content of the short message comprises the verification code based on a second syntactic rule.

11. The mobile device according to claim 10, wherein the memory further stores instructions, which, when executed by the processor, cause the processor to:
    obtain the keyword upon determining that the content of the short message received by the mobile device comprises the keyword.

12. The mobile device according to claim 11, wherein the memory further stores instructions, which, when executed by the processor, cause the processor to:
    combine the keyword and the verification code into a string; and
    display the string on the verification code input interface for preset time.

13. A method for residing a verification code in a short message received by a mobile device, the method comprising:
    by a processor in the mobile device,
       obtaining text content of the short message received by the mobile device;

determining whether the text content comprises a phrase consistent with a keyword based on a first regular expression, wherein the keyword is a phrase related to the verification code;

determining whether the text content comprises a string consistent with a preset format of the verification code based on a second regular expression in a case that the text content comprises the phrase consistent with the keyword, wherein the preset format of the verification code is a string comprising a digit, a letter or a combination thereof and having a length within a preset range;

generating the verification code comprising the string in a case that the text content comprises the string consistent with the preset format of the verification code; and displaying the verification code in a current application on a screen of the mobile device for a preset time, wherein the short message is received in a short message application of the mobile device, and the current application is different from the short message application, wherein the first regular expression is a first string for detecting whether the text content of the short message comprises the phrase consistent with the keyword based on a first syntactic rule, and wherein the second regular expression is a second string for detecting whether the text content of the short message comprises the string consistent with the preset format of the verification code based on a second syntactic rule.

14. The method according to claim 13, wherein before the generating the verification code comprising the string, the method further comprises extracting a keyword comprised in the text content; and wherein the generating the verification code comprising the string comprises generating the verification code comprising the keyword and the string.

15. The method according to claim 14, wherein the displaying the verification code in the current application on the screen of the mobile device for the preset time comprises displaying the verification code on a status bar of the screen for the preset time.

16. The method according to claim 13, wherein the displaying the verification code in the current application on the screen of the mobile device for the preset time comprises displaying the verification code on a status bar of the screen for the preset time.

17. The method according to claim 13, wherein the determining whether the text content comprises a phrase consistent with a keyword comprises:

dividing the text content into a plurality of phrases; and determining whether each of the plurality of phrases is consistent with the keyword.

* * * * *